Patented Nov. 11, 1930

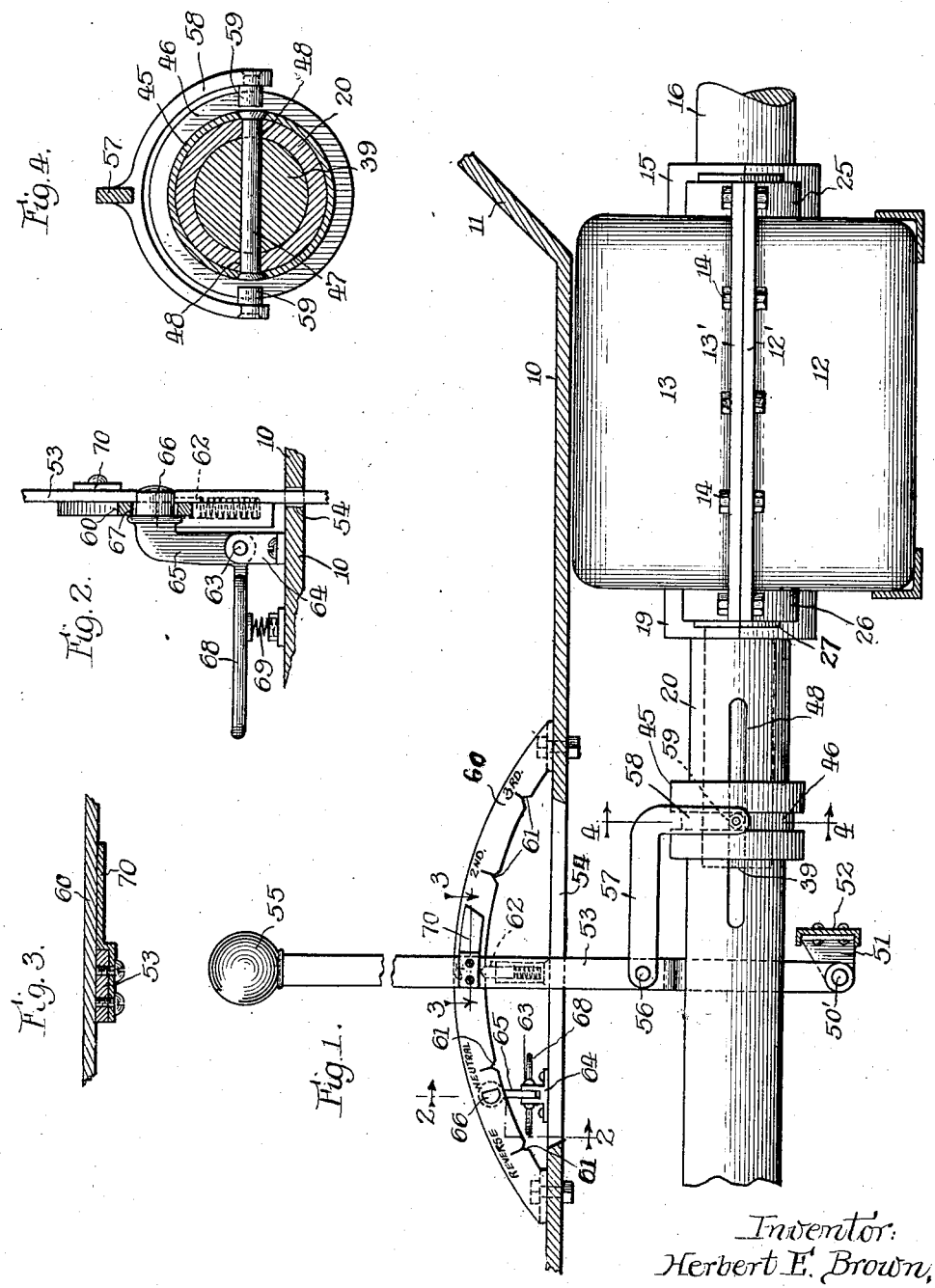

1,781,156

UNITED STATES PATENT OFFICE

HERBERT E. BROWN, OF CHICAGO, ILLINOIS, ASSIGNOR OF ONE-HALF TO MAURICE H. MANDELBAUM, OF CHICAGO, ILLINOIS

AUTOMOBILE REVERSE GUARD

Original application filed August 18, 1927, Serial No. 213,785. Divided and this application filed October 26, 1929. Serial No. 402,611.

This invention relates to the general art of variable transmission gearings for motor vehicles, and has reference more particularly to an improved device for preventing accidental throw of the gear shift lever past neutral and into reverse position.

This application constitutes a division of an application heretofore filed by me on the 18th day of August, 1927, Serial No. 213,785, which has eventuated in Letters Patent No. 1,740,725, dated December 24, 1929.

In the aforesaid Letters Patent I have disclosed a variable transmission gearing for automobiles wherein the variations in forward speed, and the reverse drive are effected by a straight line swing of an actuating lever equipped with an automatic lock for yieldingly holding the lever in neutral position and in the low, intermediate and high forward and reverse positions.

In the operation of such a lever, wherein the low, intermediate and high forward speed positions are on one side of the neutral position and the reverse position on the other, there is danger that the driver may inadvertently swing the lever past the neutral position and into the reverse position during forward motion of the car which, of course, would impose a severe strain on the transmission gears with danger of stripping the latter.

With a view to preventing such accidental shift of the lever, I have designed a simple reverse guard which is automatically spring actuated into, and maintained in, service position, but which may be retracted by the foot of the driver when the lever is to be thrown into reverse position.

The device of my present invention in its preferred form is illustrated in the accompanying drawings, in which—

Fig. 1 is a side elevation of the variable speed gearing and its lever-operated actuating mechanism, shown in relation to the front floor and foot board of the car, the latter appearing in vertical section.

Fig. 2 is a detail view of the foot-operated guard for the operating lever, viewed on the line 2—2 of Fig. 1.

Fig. 3 is a sectional detail on the line 3—3 of Fig. 1.

Fig. 4 is a cross sectional detail taken on the line 4—4 of Fig. 1.

Referring to the drawings, in Fig. 1 is shown at 10 the front floor of the car body and at 11 the inclined foot board. Rigidly mounted and secured by any suitable means below the floor board 10 is the gear box shown as comprising lower and upper halves 12 and 13 formed with meeting flanges 12' and 13' united by bolts 14. The forward end of the gear box is formed with a bearing 15 through which extends the forward end of the engine or clutch shaft 16. At the rear end of the gear box and in line with the bearing 15 is a similar bearing 19 through which extends a tubular transmission shaft 20.

With the particular nature or character of the variable speed gearing in the gear box the present invention is not concerned; but for a disclosure thereof reference may be had to my former patent hereinabove identified. In the structure of the aforesaid patent, the changes in forward speed and the reverse are effected by endwise movement of a rod 39 that is slidably mounted in the tubular transmission shaft 20. Describing next the subject matter of the present improvement, slidably mounted on the transmission shaft 20 is a collar 45 formed with a circumferential groove 46. The collar 45 is connected to the sliding rod 39 by a cross pin 47 (Fig. 4) which extends through longitudinal slots 48 formed in the transmission shaft 20. The cross pin 47 also serves to lock the slider rod 39 and the transmission shaft 20 against relative rotation.

Referring to Fig. 1, pivoted at 50' to a bracket 51 attached to a transverse beam 52 of the chassis frame, or other suitable support, is a hand lever 53 extending upwardly through a slot 54 in the floor 10 and terminating in an operating knob 55. Pivoted at 56 to the lever 53 is a link 57 formed with a depending fork 58 carrying rollers 59 (Fig. 4) travelling in the annular groove 46 of the collar 45. Cooperating with the lever 53 is a segment bar 60 mounted on the floor 10 and formed in one edge thereof with a plurality of notches 61 corresponding to neutral, low, intermediate and high forward, and reverse positions of the lever 53, the notches 61 cooperating with a spring pressed locking dog 62 on the lever which is disengageable from the notches under a forward or rearward thrust on the lever. In a construction such as that herein disclosed wherein the changes of speeds and direction are effected by a forward and rearward movement of an operating lever, it is desirable to provide means for preventing accidental excess movement or overthrow of the lever from neutral into reverse position; and to accomplish this I provide a simple foot-controlled stop device for preventing such accidental overthrow of the lever past the neutral position. This stop device, in the form herein illustrated, comprises an elbow lever pivoted at 63 to a bracket 64 attached to the floor 10 and comprising an upstanding arm 65 formed with a horizontally offset finger 66 that extends through a transverse hole in the segment bar 60, and a horizontally extending arm or pedal 68 normally upheld by an underlying spring 69. In the normal position of this stop device, shown in Fig. 2, the finger 66 lies across the path of rearward swing of the lever 53 between the neutral and reverse notches 61, and thus serves as a stop for the lever when the latter is in neutral position. To throw the gearing into reverse, the driver depresses the pedal 68 with his foot, withdrawing the stop 66. To make it unnecessary to again depress the pedal 68 before the lever can be returned from reverse to neutral or to one of the forward drive positions, I preferably equip the lever with a laterally extending keeper 70 (Figs. 1 and 3) that has a sliding engagement with the segment bar 60 and thus holds the stop finger 66 retracted when the lever is in reverse position and between neutral and reverse positions.

From the foregoing it will be seen that the stop finger 66, under the thrust of the spring 69, is normally in a position to block movement of the lever 53 to reverse position. When the gearing is to be thrown into reverse, the driver merely depresses the pedal 68 with his foot, and throws the lever into the reverse position. As soon as the lever has passed the stop, the foot may be raised from the pedal 68, and the keeper 70 maintains the stop retracted until the lever has again been shifted to or beyond the neutral position, whereupon the stop 66 instantly resumes its normal working position.

I am aware that a reverse guard mounted on the gear shift lever and hand operated has heretofore been proposed, and also that a foot-operated guard requiring to be moved both into and out of operative position by the hand or foot of the driver has heretofore been proposed. The guard herein disclosed has the advantages that it does not have to be operated by the same hand that throws the gear shift lever, nor does it have to be manually operated both into and out of operation. With the present device, to throw the transmission gearing into reverse, a light foot pressure on the pedal 68 is all that is required, the stop device automatically returning to operative position as soon as the gear shift lever has been returned from reverse position to neutral position.

I claim:

1. In a reverse guard for a variable speed transmission gearing, the combination with a segment bar formed with neutral and reverse locking notches, a pivoted lever slidable along said segment bar, and a spring pressed locking dog on said lever automatically engageable with said notches, of a spring pressed stop member normally lying across the path of movement of said lever between said notches, means for retracting said stop member, and a keeper on said lever operative to hold said stop member retracted during movement of said lever between said neutral and reverse notches.

2. In a reverse guard for a variable speed transmission gearing, the combination with an apertured segment bar formed with a neutral locking notch and with forward and reverse locking notches respectively located on opposite sides of said neutral notch, a pivoted lever slidable along said segment bar, and a spring-pressed dog on said lever automatically engageable with said notches, of an elbow lever pivoted at its elbow adjacent to said segment bar, the upstanding arm of said lever carrying a finger slidable through the aperture of said segment bar to block movement of said first-named lever to reverse position, and the other arm of said elbow lever constituting a pedal, a spring acting on said elbow lever to force said finger through said aperture, and a keeper on said first-named lever slidable across said aperture and serving to hold said stop finger retracted during movement of said lever between said neutral and reverse notches.

HERBERT E. BROWN.